(12) United States Patent
Markendorf (10) Patent No.: US 9,945,938 B2
(45) Date of Patent: Apr. 17, 2018

(54) SELF-CALIBRATING LASER TRACKER AND SELF-CALIBRATION METHOD

(71) Applicant: LEICA GEOSYSTEMS AG, Heerbrugg (CH)

(72) Inventor: Albert Markendorf, Walde (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 377 days.

(21) Appl. No.: 14/653,802

(22) PCT Filed: Dec. 19, 2013

(86) PCT No.: PCT/EP2013/077453
§ 371 (c)(1),
(2) Date: Jun. 18, 2015

(87) PCT Pub. No.: WO2014/096231
PCT Pub. Date: Jun. 26, 2014

(65) Prior Publication Data
US 2016/0209500 A1 Jul. 21, 2016

(30) Foreign Application Priority Data

Dec. 21, 2012 (EP) .................................... 12198845

(51) Int. Cl.
*G01S 7/40* (2006.01)
*G01S 7/497* (2006.01)
(Continued)

(52) U.S. Cl.
CPC .......... *G01S 7/4972* (2013.01); *G01S 7/4817* (2013.01); *G01S 17/023* (2013.01); *G01S 17/66* (2013.01)

(58) Field of Classification Search
CPC ........... G01S 7/497; G01S 7/481; G01S 17/42
See application file for complete search history.

(56) References Cited

U.S. PATENT DOCUMENTS

| 4,714,339 A | 12/1987 | Lau et al. |
| 4,790,651 A | 12/1988 | Brown et al. |

(Continued)

FOREIGN PATENT DOCUMENTS

| DE | 199 41 638 C1 | 12/2000 |
| EP | 0 405 423 A2 | 1/1991 |

(Continued)

OTHER PUBLICATIONS

European Search Report dated Apr. 18, 2013 as received in Application No. 12 19 8845.

*Primary Examiner* — Luke D Ratcliffe
(74) *Attorney, Agent, or Firm* — Maschoff Brennan (57) ABSTRACT

Some embodiments of the invention relate to a laser tracker for determining the position of a target, comprising a beam source for generating measurement radiation; a base; a beam deflection unit which can pivot with respect to the base −4° C. about two axes in a motorized manner, for the emission and alignment of the measurement radiation and to capture at least one part of the measurement radiation reflected onto the target; a first position-sensitive surface detector and an evaluation and control unit for determining a point of impact of the reflected measurement on the surface detector for generating an output signal in order to determine the position of said target. Said laser tracker also comprises a calibration device for use with a self calibrating function to determine the calibration parameters thereof with respect to a position and/or direction of the measurement radiation.

17 Claims, 9 Drawing Sheets

(51) Int. Cl.
G01S 17/02 (2006.01)
G01S 7/481 (2006.01)
G01S 17/66 (2006.01)

(56) References Cited

U.S. PATENT DOCUMENTS

| | | |
|---|---|---|
| 5,146,290 A | 9/1992 | Hartrumpf |
| 6,411,372 B1 | 6/2002 | Donath et al. |
| 6,667,798 B1 | 12/2003 | Markendorf et al. |
| 7,180,607 B2 | 2/2007 | Kyle et al. |
| 8,031,331 B2 | 10/2011 | Meier et al. |
| 2009/0109426 A1* | 4/2009 | Cramer ............... G01B 11/005 356/154 |
| 2010/0303300 A1* | 12/2010 | Svanholm ............ G01C 15/00 382/106 |
| 2015/0346330 A1 | 12/2015 | Markendorf |

FOREIGN PATENT DOCUMENTS

| | | |
|---|---|---|
| EP | 1 420 264 A1 | 5/2004 |
| EP | 2746807 A1 | 6/2014 |
| WO | 01/09642 A1 | 2/2001 |
| WO | 2005/026772 A2 | 3/2005 |
| WO | 2007/079600 A1 | 7/2007 |
| WO | 2009/100773 A1 | 8/2009 |

* cited by examiner

SELF-CALIBRATING LASER TRACKER AND SELF-CALIBRATION METHOD

FIELD OF THE INVENTION

Some embodiments of the invention relate to a self-calibrating laser tracker for determining coordinates of spatial points. The laser tracker comprises a stationary part having a base, a part that is rotatable about a vertical axis relative to the base, and a beam directing unit, which is rotatable together with the rotatable part, and also a laser light source for providing a laser beam to be emitted by the beam directing unit with a target axis and a direction of incidence on a reflector or target point to be targeted.

BACKGROUND

Some embodiments of the invention also relates to an associated self-calibration method for a laser tracker.

Laser trackers as coordinate measuring machines belong to a type of measuring machines which measure the coordinates of a (spatial) point by emitting a laser beam onto the point. The laser beam may impinge directly on the point or on a retroreflector (often a cube corner prism or "corner cube" or arrangement having three mirrors oriented perpendicularly to one another) which is in contact with the point. In the case of a retroreflector, the laser beam impinging thereon is reflected "on itself", i.e. coaxially with respect to the emitted laser beam, if the latter impinges exactly on the center of the retroreflector. Otherwise, if the emitted laser beam impinges on the retroreflector outside the center thereof, the reflected laser beam has a parallel offset with respect to the emitted laser beam.

The machine typically determines the coordinates of the point by measuring the distance between the point and the measuring machine and two angles by means of angle encoders or angle sensors assigned to rotation axes of the laser tracker between a standard orientation of the laser beam with regard to its targeting direction with respect to the point to be measured. The distance is measured by a distance measuring device, such as, for example, an absolute distance measuring device and/or an interferometer. Exemplary systems for determining coordinates of a point are disclosed in U.S. Pat. No. 4,790,651 and U.S. Pat. No. 4,714,339.

Laser trackers are a special type of coordinate measuring machines used to track an, in particular moving, target point, in particular embodied as a retroreflector, by means of one or a plurality of, in particular focused, laser beams.

Reliable use of laser trackers that is reproducible in the measurement result necessitates the setting and application of calibration parameters. Calibration parameters are typically stored as numerical values in the form of software or firmware in a manner accessible to the laser tracker controller and, when applied to the raw measurement data of the laser tracker, serve to improve the measurement accuracy. Typically, the manufacturer of the laser tracker carries out so-called calibration measuring methods for determining the calibration parameters and stores the corresponding calibration parameters with the control software. On the machine side, certain tolerances regarding the extent to which current calibration parameters are allowed to deviate from previously stored calibration parameters are usually additionally defined with the control. In order to determine changes in the machine calibration, monitoring calibration measurements are typically carried out at specific intervals and/or when the laser tracker is switched on.

Changes in the required machine calibration are based in particular on thermal drift effects, but also on mechanical vibrations, for example.

EP 1 420 264 discloses a laser tracker and a measuring method implementable therewith with calibration devices and specifications. A measuring system is described which comprises a measuring machine having a laser tracker and an optoelectronic sensor in invariable positions relative to one another, a system computer and a separate auxiliary measuring instrument, i.e. which is to be arranged at a distance from the laser tracker, with a reflector and at least three light points. The laser tracker is calibrated by means of the method steps described below: the auxiliary measuring instrument is rigidly connected to an arrangement of auxiliary reflectors and moved about at least two rotation axes that differ from one another relative to the auxiliary measuring instrument. In at least two respective rotation positions about each of the at least two rotation axes, reflector and auxiliary reflectors are targeted by the laser tracker and the light points of impinging laser light are registered by the optoelectronic sensor. Positions and orientations of the reflector arrangement relative to the laser tracker are determined from the measurement data of the laser tracker and positions and orientations of the light point arrangement relative to the optoelectronic sensor are determined from the measurement data of the optoelectronic sensor and the at least two rotation axes relative to the reflector arrangement and to the light point arrangement are calculated therefrom. The calibration data are then calculated from the measurement data ascertained.

This system arrangement and the calibration method associated therewith do not correspond to the arrangement nor to the typically imposed specifications of a laser tracker according to the present invention and, in particular, nor do they correspond to present-day requirements made of such a measuring system.

Particularly disadvantageously, the auxiliary measuring instrument for the calibration is arranged outside the measuring machine or laser tracker, which does not satisfy requirements made of present-day laser trackers for the fullest possible compactly arranged integration or combination with the measuring machine, and a self-calibration method comprising automatically proceeding, machine-controlled method steps without the involvement of an operator cannot be gathered from EP 1 420 264.

US 2009/0109426 and WO 2005/026772 disclose a self-calibrating laser tracker comprising a laser for emitting a laser beam, a plane mirror and at least two integrated immobile, reflective devices and also a rotatable mirror and a position-sensitive detector. One of the at least two immobile, reflective devices is embodied as a corner cube retroreflector, and a second as a plane mirror. The corner cube retroreflector and the plane mirror can be fixed in position on a stationary part of the measuring system and are designed to reflect the laser beam according to a two-position measuring method, i.e. in a "front-side mode" and a "rear-side mode". In this case, the "front-side mode" corresponds to the orientation of the laser tracker in accordance with a regular target tracking, and the "rear-side mode" corresponds to an opposite orientation of the laser tracker.

In accordance with the arrangements disclosed in US 2009/0109426 and WO 2005/026772, measurement values of temperature sensors arranged on the machine are used to ascertain a temperature dependence of the values to be determined for the calibration parameters.

The arrangements disclosed in US 2009/0109426 and WO 2005/026772 are disadvantageous, however, owing to the need to use a complexly producible individual retroreflector such as a corner cube retroreflector having precisely defined or produced reflective surfaces and very stringent requirements made of its exact positioning for the purposes of reliable self-calibration of the alignment of a laser tracker.

SUMMARY

Some embodiments of the invention provide a coordinate measuring machine, in particular a laser tracker, which is improved compared with the prior art and has fewer complex optical components for performing a self-calibration of the alignment of the laser tracker, in conjunction with a simplified implementation of the self-calibration. In this case, the laser tracker is intended to be designed to enable such a self-calibration of its alignment automatically, in particular after start-up of the machine, without required activities or interventions on the part of a user. Moreover, all components required for such a self-calibration are intended to be integrated in the coordinate measuring machine or the laser tracker or arranged fixedly thereon.

Some embodiments include a self-calibrating coordinate measuring machine, in particular a self-calibrating laser tracker, for determining coordinates of spatial points. Hereinafter, all indications with regard to a laser tracker also relate to a corresponding coordinate measuring machine. The laser tracker comprises a stationary part having a base, a part that is rotatable about a vertical axis relative to the base, and a beam directing unit, which is rotatable together with the rotatable part, and also a laser light source for providing a laser beam to be emitted by the beam directing unit with a target axis and a direction of incidence on a reflector or target point to be targeted. An inclination sensor for determining an inclination in a horizontal direction and a vertical direction perpendicular to the horizontal direction is preferably arranged on the base. Furthermore, the laser tracker has a tilting axis and a vertical axis. A beam splitter for deflecting a laser beam returning from the target point or the reflector onto a first position-sensitive surface detector integrated in the beam directing unit is integrated in the beam directing unit. The position-sensitive surface detector can be a first PSD, in particular; however, image sensors such as CCD or CMOS are likewise usable as well. An evaluation and control unit for determining an impingement point of the reflected measurement radiation on the surface detector for generating an output signal for determining the position of the target and in particular for controlling a target tracking functionality is likewise provided.

In particular, the laser tracker can comprise even further generic components, inter alia a camera for capturing the spatial orientation of the target, and at least one camera for coarsely localizing the target, additionally an absolute distance measuring device and an interferometer for providing the distance measuring functionality. The measurement radiation can preferably be generated by a helium-neon laser furnace.

The laser tracker according to the invention is characterized by a calibration device fitted outside the beam directing unit, in particular on the base, for use with a self-calibration functionality, in the context of which calibration parameters are determinable with regard to a position and/or direction of the measurement radiation, in particular a parallel offset and a direction deviation of the measurement radiation. According to the invention, the calibration device has a position-sensitive surface detector, preferably in the form of a second PSD; however, image sensors such as CCD or CMOS are likewise usable as well. The second PSD is positioned such that measurement radiation is emittable onto it by the beam directing unit. According to the invention, the evaluation and control unit is additionally designed for determining an impingement point of measurement radiation impinging on the second PSD, whereby calibration parameters are determinable with regard to a position and/or direction of the measurement radiation.

The invention thus provides a laser tracker which enables an automatically proceeding self-calibration of the alignment of the laser tracker without required activities or interventions on the part of a user.

In one preferred embodiment, a two-position measurement is implementable in the context of the self-calibration functionality by the laser tracker, wherein, in the context of the two-position measurement, measurement radiation is emittable onto the second PSD in a first and a second orientation of the beam directing unit, in particular wherein the beam directing unit is rotated by 180° with respect to the horizontal pivoting angle in the second orientation in comparison with the first orientation and/or and is "upside-down" relative thereto.

In each of the two orientations, the measurement radiation is preferably firstly adjusted to a previously determined servo control point and the horizontal pivoting angle and the vertical pivoting angle are subsequently determined by means of the angle measuring functionality.

In a further preferred embodiment, the calibration device has an optical element arranged upstream of the second position-sensitive surface detector in the beam direction of the measurement radiation. In this case, the optical element is preferably provided on the base in a known spatial relation with respect to the second position-sensitive surface detector, and is fashioned and arranged in such a way that calibration parameters are determinable with regard to a direction of the measurement radiation.

Preferably, upstream of the second PSD in the direction of incidence thereon, an optical element as part of the calibration device is provided, in particular in a manner partly transmissive to the measurement radiation.

In one embodiment, said optical element is a pinhole diaphragm fitted upstream of the second PSD and serving as a collimator. Diaphragm and PSD are preferably arranged relative to one another as in a pinhole camera. In this case, the direction of the target axis can be determined independently of an offset of the target axis that is possibly present. Advantageously, moreover, no stringent demands are placed on an exact orientation of the pinhole camera since a non-orthogonal orientation of the pinhole camera with respect to the target axis can be compensated for by means of a sufficiently dimensioned PSD.

Preferably, the opening of the diaphragm is smaller than the beam diameter. Inter alia, this makes it possible—even if the beam diameter is not symmetrical—to be able to determine sufficiently accurately when the measurement radiation is collimated with the pinhole camera. If the beam is moved in a grid over the pinhole camera by means of vertical and tilting axes, it is thus possible to record the intensity distribution within the beam. The centroid can then be calculated from the individual observations, in a manner similar to that in the case of the pixels of a CCD or CMOS sensor. By virtue of the fact that each observation can be assigned both a position value on the second PSD and an angle value of the laser tracker, the pinhole camera, i.e. its imaging scale or chamber constant, is advantageously automatically concomitantly calibrated by the scanning. The system is accordingly self-calibrating and has to remain stable only for the short duration of the scanning. Preferably, an optical grating can also be provided on the diaphragm, said optical grating, when irradiated by the measurement radiation, generating an interference pattern on the surface of the second PSD, in particular wherein the interference pattern can be used for accurately determining an impingement point of the measurement radiation on the second PSD.

In one embodiment, the optical element is designed for reflecting part of the measurement radiation as reflected measurement radiation onto the first PSD.

In one particular embodiment, the pinhole diaphragm fitted upstream of the second PSD is designed as a retroreflector, for example—as described in WO 01/09642 A1 or in EP 0 405 423 A2—as a triple mirror with partial antireflection coating. Alternatively, the pinhole diaphragm can also have a reflective surface, in particular designed as a plane mirror or a retroreflective film. In these cases, the opening of the pinhole diaphragm is preferably smaller than the beam diameter of the measurement radiation, and the reflective surface preferably directly adjoins the opening. A first part of the measurement radiation thus impinges on the second PSD, while a second part of the measurement radiation is (retro)reflected onto the first PSD by the reflective surface or the retroreflector.

In one embodiment, the optical element is designed as a reflection means that is partly transmissive to the measurement radiation.

In this case, the partly transmissive reflection means can be a partly transmissive plane mirror for determining the target axis direction error by means of autocollimation. Such a combined arrangement in which light impinging on the partly transmissive plane mirror partly passes through onto the PSD arranged behind said mirror in the direction of incidence can advantageously make it possible to combine measurements of a target axis direction error and an offset of the target axis in one measuring process, which in particular also enables the implementation of the self-calibration measurements to be accelerated. In particular, the plane mirror can be arranged directly on the PSD surface.

Moreover, the partly transmissive reflection means can be a partly transmissive retroreflector for determining a beam offset of the reflected laser beam impinging on the first PSD. Said retroreflector can be designed in the form of an individual reflector, such as, for example, a prism or a corner cube, for example a triple mirror with partial antireflection coating—as described in WO 01/09642 A1 or in EP 0 405 423 A2—, or alternatively as a retroreflective film or a rigid retroreflector made of plastic and in particular composed of individual prisms or individual reflective spheres, as described in the European patent application having the application number EP12198763.0. The production of such retroreflectors consisting of small individual reflectors is advantageously associated with relatively low complexity and therefore also correspondingly low product costs, particularly if products sold in large quantities are involved. In particular, such a retroreflector can be arranged directly on the PSD surface.

In a further embodiment, the optical element is a beam splitter, and the calibration device additionally has a retroreflector or a plane mirror. In this case, the second PSD and the retroreflector or the plane mirror are targetable simultaneously by the laser beam by means of the beam splitter by virtue of the fact that the beam splitter forwards the laser beam proportionally to both elements.

In a further embodiment, the calibration device has on the base a reflection means, onto which measurement radiation is emittable by the beam directing unit for reflecting the measurement radiation as reflected measurement radiation onto the first position-sensitive surface detector, in particular wherein the reflection means is a retroreflector and in particular whereby a servo control point is determinable as part of the calibration parameters.

For the embodiments mentioned, appropriate reflection means include, in particular, plane mirrors, retroreflectors in the form of individual reflectors and retroreflective films.

In a further embodiment, the optical element is an optical lens by means of which the measurement radiation is imaged sharply and in particular in a punctiform fashion on the second PSD.

As an alternative or in addition to the above-described arrangement of an optical element upstream of the second PSD, the PSD can also be designed to be partly transmissive to the radiation and arranged upstream of a retroreflector or a plane mirror. A combination of a plurality of optical elements is also possible, particularly when a beam splitter is used.

Further subject matter of the invention is a self-calibration method for a laser tracker according to the invention. The laser tracker comprises a stationary part having a base, a part (support) that is rotatable about a vertical axis relative to the base, and a beam directing unit, which is rotatable together with the support, and also a laser light source for providing a laser beam to be emitted by the beam directing unit with a target axis and a direction of incidence on a reflector or target point to be targeted. An inclination sensor for determining an inclination in a horizontal direction and a vertical direction perpendicular to the horizontal direction is preferably arranged on the base. Furthermore, the laser tracker has a tilting axis and a vertical axis. A beam splitter for deflecting a laser beam returning from the target point or the reflector onto a first PSD integrated in the beam directing unit is integrated in the beam directing unit.

As a substep of the method, optionally, the inclination sensor is used to determine an inclination of the base in a horizontal direction and a vertical direction perpendicular to the horizontal direction.

According to the invention, the method comprises as further steps:
  emitting a laser beam from the beam directing unit onto a second PSD, which is fitted to the base or to the support,
  determining an impingement point of the laser beam on the second PSD, and
  determining calibration parameters with regard to a position and/or direction of the laser beam on the basis of the impingement point determined.

In one preferred embodiment, measurement radiation is also emitted onto a reflection means, in particular simultaneously. In this case, a first part of the measurement radiation impinges on the second PSD, and a second part of the measurement radiation is reflected by the reflection means as reflected measurement radiation onto the first position-sensitive surface detector. The reflection means can comprise both a retroreflector and a plane mirror. The method then also includes determining an impingement point of the laser beam on the first PSD.

In accordance with one preferred embodiment of the invention, said reflection means comprises a retroreflector consisting of many individual prisms, as described in the European patent application having the application number EP12198763.0. In accordance with this embodiment of the method according to the invention, a corresponding movement of the beam directing unit generates temporally sequentially a two-dimensional course of the impingement point of the laser beam on a surface of the retroreflector, in particular with a two-dimensionally circle-like or loop-like geometrical contour. Measurement data of reflections taking place sequentially at individual reflectors of the retroreflector that are moved in the beam path are averaged. Advantageously, such a guidance of the incident laser beam onto the reflector consisting of many individual reflectors can reduce or even eliminate disadvantageous effects as a result of incorrect reflections or even failure of reflections at imperfectly formed surfaces of the retroreflector.

In one embodiment, the method comprises as a further step generating
a shadow casting by means of a pinhole diaphragm,
an interference pattern by means of an optical grating and/or
a sharp imaging of the measurement radiation on the second PSD of an optical lens.

In a further embodiment, the method comprises as a further step moving the measurement radiation in a grid over a pinhole diaphragm arranged upstream of the second position-sensitive surface detector in the beam direction of the measurement radiation, in particular for ascertaining an intensity distribution within the measurement radiation and/or a centroid of the measurement radiation on the second PSD.

In a further embodiment, the method comprises as further steps:
emitting measurement radiation onto a retroreflector,
generating a retroreflection of measurement radiation impinging on the retroreflector as reflected measurement radiation,
determining an impingement point of the measurement radiation reflected by the retroreflector on the first PSD, and
determining a servo control point.

In a further embodiment, the method comprises as a further step simultaneously emitting the measurement radiation onto the second PSD and onto a reflection means, wherein a first part of the measurement radiation impinges on the second PSD, and a second part of the measurement radiation is reflected by the reflection means as reflected measurement radiation onto the first PSD. The reflection means can comprise in particular a retroreflector or a plane mirror, and additionally be fashioned as partly transmissive to the measurement radiation.

In a further embodiment, the method comprises a two-position measurement, in the context of which the measurement radiation is emitted onto the second PSD in a first and a second orientation of the beam directing unit. In this case, the beam directing unit is rotated in particular by 180° with respect to the horizontal pivoting angle in the second orientation compared with the first orientation. The two-position measurement additionally comprises determining the impingement point of the measurement radiation on the second PSD for both orientations of the beam directing unit.

BRIEF DESCRIPTION OF THE DRAWINGS

The laser tracker according to the invention and the self-calibration method according to the invention are described in greater detail purely by way of example below on the basis of concrete exemplary embodiments illustrated schematically in the drawings, further advantages of the invention also being discussed. In the figures specifically.

DETAILED DESCRIPTION

Figure 1:
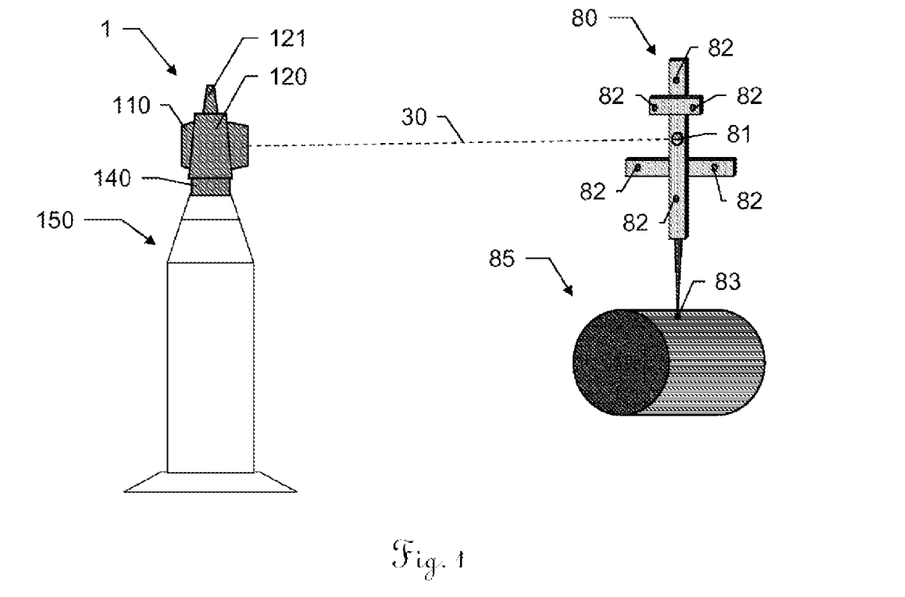
FIG. 1 shows a laser tracker according to the invention and a measuring aid.

FIG. 1 shows a laser tracker 1 according to the invention, comprising a base 140, a support 120 fitted thereon and having a handle 121, and a beam directing unit 110 mounted on two struts (not illustrated) of the support 120. The laser tracker 1 depicted is arranged on a stand 150 and, by means of a laser beam 30, measures the distance to a retroreflector 81 situated on a measuring aid 80. The measuring aid 80—embodied here by way of example as a measuring probe—furthermore comprises a number of target markings 82, for example in the form of reflective or self-luminous light points, and also a measuring head 83 for positioning on a target point to be measured of a target object 85.

The laser tracker 1 illustrated comprises a measuring camera, which is configured in particular as a focusable zoom camera system having variable magnification in order to capture the target markings arranged on the measuring aid 80. The spatial 82 orientation of the measuring aid 80 is determinable on the basis of the positions of the target markings 82 that are recorded by the measuring camera.

In order to identify and to be able to reproduce movements of the measuring aid 80, such that the laser beam 30 remains aligned with the retroreflector 81, the laser tracker 1 comprises a position-sensitive detector (PSD) or some other optoelectronic sensor, in particular a tracking surface sensor, such as is disclosed for example in WO 2007/079600 A1.

The PSD is preferably arranged in the beam directing unit 110 and enables an evaluation and control unit to track the alignment of the laser beam 30 by detecting the alignment of the laser beam reflected from a target, in particular the retroreflector 81. The tracking of the laser beam alignment makes it possible for continuous target tracking of the target point to be carried out and for the distance and position of the target point to be determined continuously relative to the measuring machine.

Figure 2:
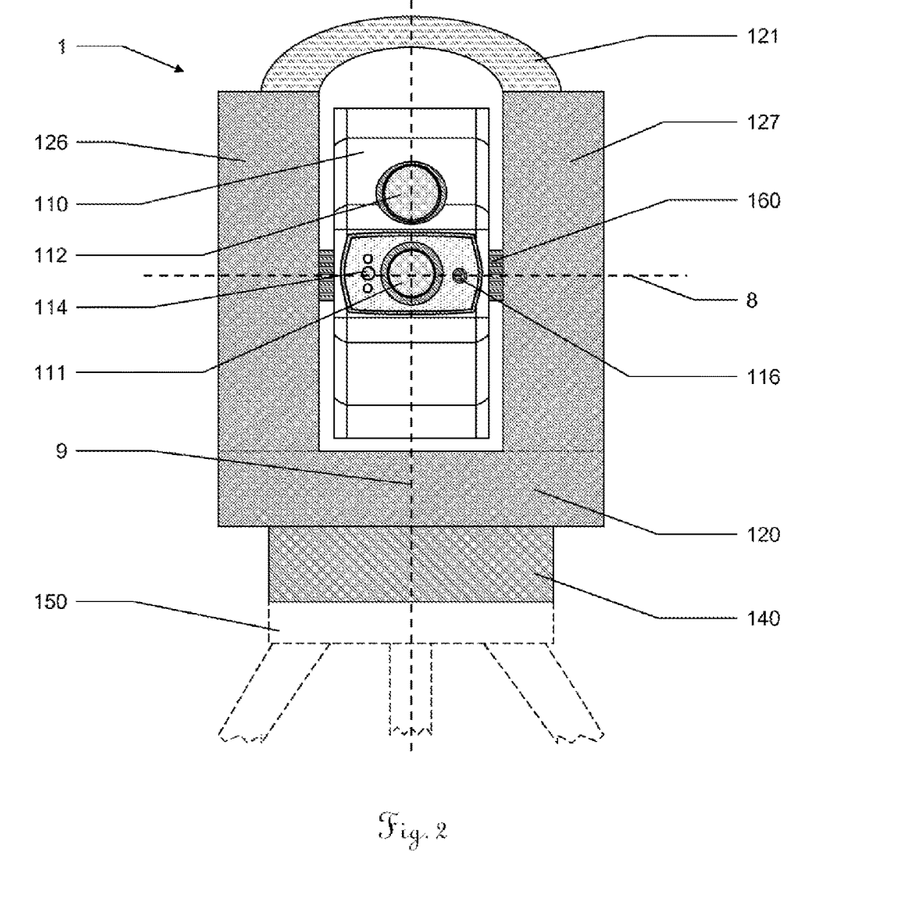
FIG. 2 shows a laser tracker according to the invention in a front view.

FIG. 2 shows one exemplary embodiment of a laser tracker 1 according to the invention in a frontal view. The laser tracker 1 comprises a base 140, which is fixable on a holding device, here illustrated in the form of a stand 150. A support 120 is fitted on the base 140 in a manner mounted rotatably about the vertical axis 9. The support 120 has a first strut 126 and a second strut 127, which project upward from the support 20 and on which a beam directing unit 110 is mounted tiltably about the horizontal axis 8 by means of a shaft 160. A handle 121 for the transport and handling of the laser tracker 1 is fitted to the two struts 126, 127. The handle 121 can be fixedly connected to the struts 126, 127, for example produced from a molding therewith or welded thereto, such that it serves as an additionally stabilizing element for the struts 126, 127, in particular with regard to bending.

In this exemplary embodiment, a plurality of optical units are provided on the beam directing unit 110, in particular an optical unit 112 of a measuring camera and also a laser emitting and receiving optical unit 111 of an optical distance measuring device. Furthermore, the beam directing unit 110 preferably has an optical unit of a localization camera 114 for coarsely localizing the measuring aid 80 and an optical unit of an overview camera 116 for providing images for a user.

Figure 3A:
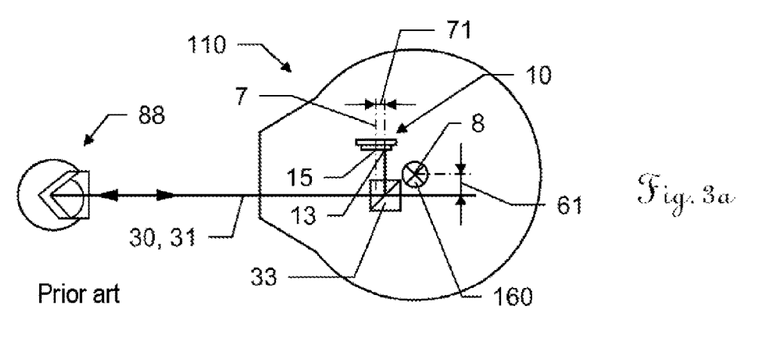
FIGS. 3a-b show a use of a retroreflector as a calibration device for determining a beam offset of the returning laser beam impinging on the first PSD.
Figure 3B:
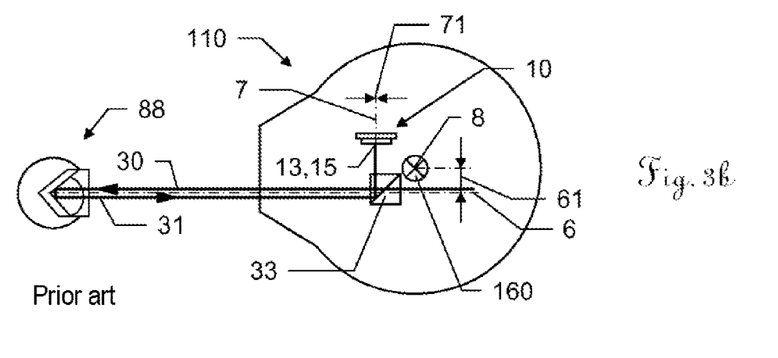

FIGS. 3a and 3b illustrate the known use of a calibration device in the form of a large individual reflector 88, such as a prism or a corner cube, for example, for determining a beam offset 61 of the returning laser beam 31, impinging on the position-sensitive detector (PSD) 10, relative to the detector center 15, and also the disadvantages that arise in the case of this use.

In accordance with the alignment of the emitted measurement radiation 30 according to FIG. 3a, said radiation passes exactly through the center of the beam splitter 33 and also impinges exactly in the center of the individual retroreflector 88 in such a way that it is deflected on itself as reflected measurement radiation 31 through the beam splitter 33 onto the PSD 10 having a detector center 15.

On the PSD 10, the reflected measurement radiation 31 impinges at a point 13 that is generally different than the detector center 15. If the direction and positioning of the emitted measurement radiation 30 on the retroreflector are adjusted, this impingement point is identical to a so-called servo control point, the accurate determination of which is essential for further measures and measurements for the self-calibration of the laser tracker. The servo control point determined in such a way generally has an offset 71 with respect to the detector center 15.

FIG. 3a furthermore indicates a telescope rotation axis 8, about which the beam directing unit 110 is rotatable, a beam offset 61 between a central axis through the rotation axis 8 and the returning laser beam 31 and the axes 6 and 7. In accordance with the situation according to FIG. 3a, the offset 71 and the beam offset 61 can be determined separately from one another.

FIG. 3b illustrates a situation according to which the emitted laser beam 30 does not impinge centrally on the individual reflector 88, but the distance 71 on the PSD 10 and the beam offset 61 of the target axis are known in a jointly correlated manner. In accordance with this situation, the emitted laser beam 30 does not impinge centrally on the center of the individual retroreflector 88, but rather on a first lateral reflection surface, and is deflected around the center of said retroreflector onto an opposite second (and third) reflection surface, from where it is reflected as returning laser beam 31 with a parallel offset with respect to the emitted laser beam 30. In the special case illustrated, the laser beam then impinges on the PSD 10 with a value zero of the offset 71 with respect to the detector center 15.

The offset 71 ("PSDOffset") and the beam offset 61 ("ZAAbst") can be determined by a total offset ("Offset'") containing both individual parameters on the PSD 10 and can then be separated from one another by means of a simple equation system:

$$Direction_{corrected} = \arctan\left(\frac{PSDOffset - ZAAbst}{2 \times Dist}\right) - \text{Direction error} \quad (1)$$

$$PSDOffset - ZAAbst = \text{Offset}' \quad (2)$$

As long as PSD offset (offset 71) and target axis distance (beam offset 61) are small enough, in this case the beam overlap between outgoing and returning beam remains good enough for reliable measurements in the case of use of laser interferometers (IFM) and absolute distance measuring devices (ADM). For an accurate calibration, however, such a case in which no offset occurs is preferred.

Figure 4:
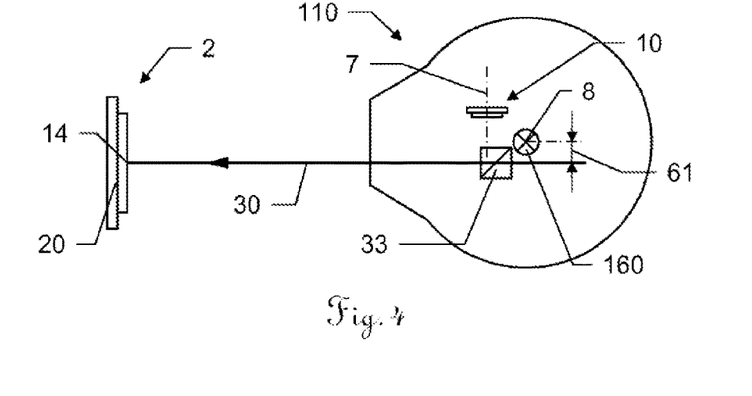
FIG. 4 shows a first embodiment of the calibration device according to the invention, comprising a second PSD.

FIG. 4 shows a first embodiment of the calibration device 2 according to the invention. In contrast to the arrangement shown in FIGS. 3a-b, this calibration device 2 has a second PSD 20 instead of the individual reflector 88.

In accordance with the alignment of the emitted measurement radiation 30 according to FIG. 4, said radiation passes exactly through the center of the beam splitter 33 and impinges on the second PSD 20 at the impingement point 14. Particularly for a determination of the target axis distances, the second PSD 20 can be embodied with high resolution as a position-sensitive detector or a line camera having a great multiplicity of light detection elements (pixels), but also as a photodiode having a light-sensitive region having a smaller diameter than the incident measurement radiation 30, a maximum measurement signal being ascertained in the beam center, as a four-quadrant diode, as two line cameras arranged at a right angle with respect to one another, or as a single line camera with a grating.

Figure 5A:
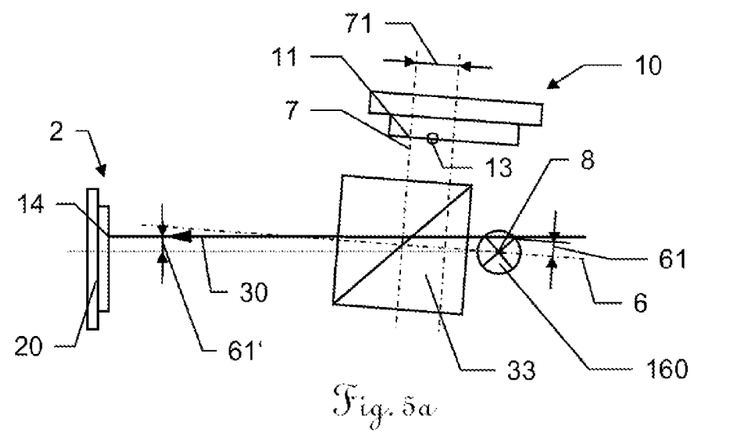
FIGS. 5a-b show a two-position measurement for determining a target axis direction error of the incident laser beam with the first embodiment of the calibration device according to the invention.
Figure 5B:
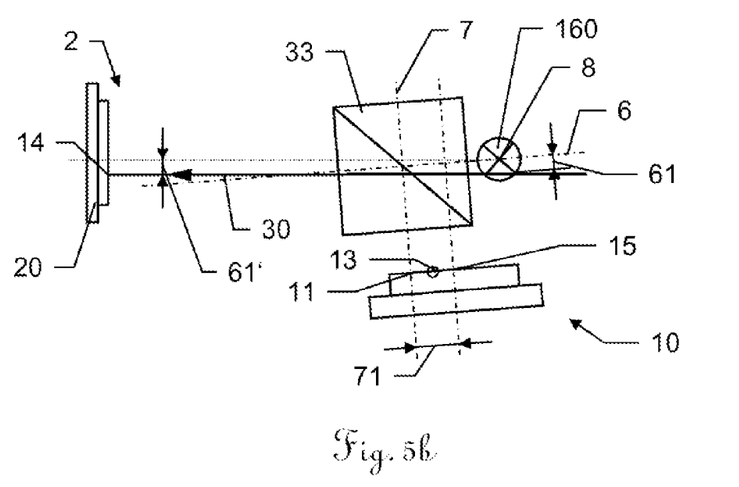

FIGS. 5a-b show a two-position measurement with the first embodiment of the calibration device 2 according to the invention from FIG. 4.

In order to determine the distances between the target axis and a vertical axis and a tilting axis, a two-position measurement with a prism or corner cube as retroreflector fixed on the stationary part is known from the prior art. In this case, previously determined values for target axis direction error, based on the angle differences determined in a two-position measurement, and the distance to the retroreflector are assumed to be known. According to the invention, however, it is advantageous—with an otherwise identical system configuration and arrangement—to replace the individual reflector, as shown in FIG. 4, by a second PSD 20. According to the invention, there are two alternative procedures for such a configuration for determining the target axis distances 61:

Firstly, in accordance with the illustrations in FIGS. 5a-b, the targeting of a spatial point 12 on the second PSD 20, said spatial point being identical for the measurements in the two positions, and determination of the target axis distances taking account of the directions measured at the angle encoders.

Secondly, free positioning of the measurement radiation 30 on the second PSD 20 twice, in association with a determination of the distance between the respective impingement point on the second PSD 20 and the detector center thereof. This second procedure variant presupposes a preceding calibration with a determination of imaging scale and rotation, which is implementable by means of the scanning of the surface of the second PSD 20 with the measurement radiation 30, by means of the guidance thereof by the movement of the beam directing unit 110 about the vertical and tilting axes.

Figure 6A:
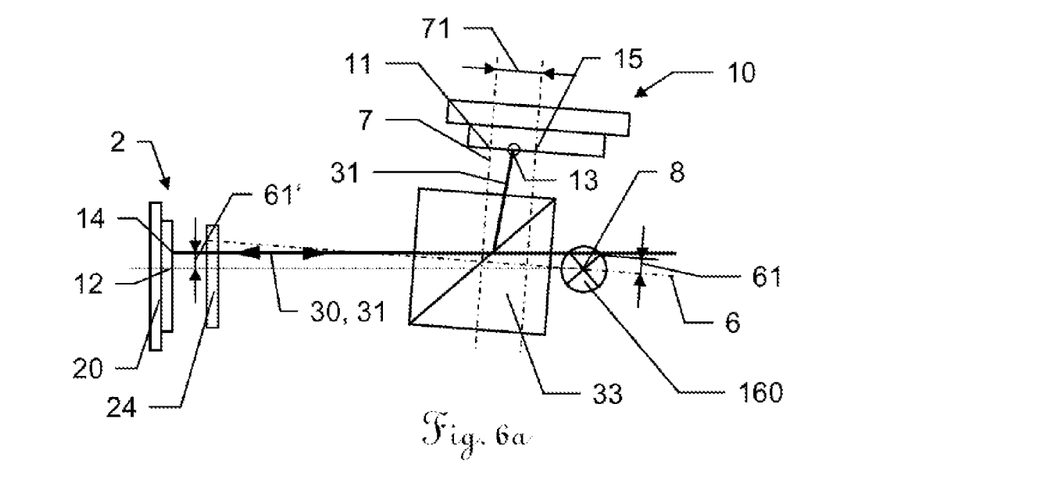
FIGS. 6a-b show a two-position measurement for determining a target axis direction error of the incident laser beam with a second embodiment of the calibration device according to the invention, comprising a second PSD behind a semi-transmissive plane mirror.
Figure 6B:
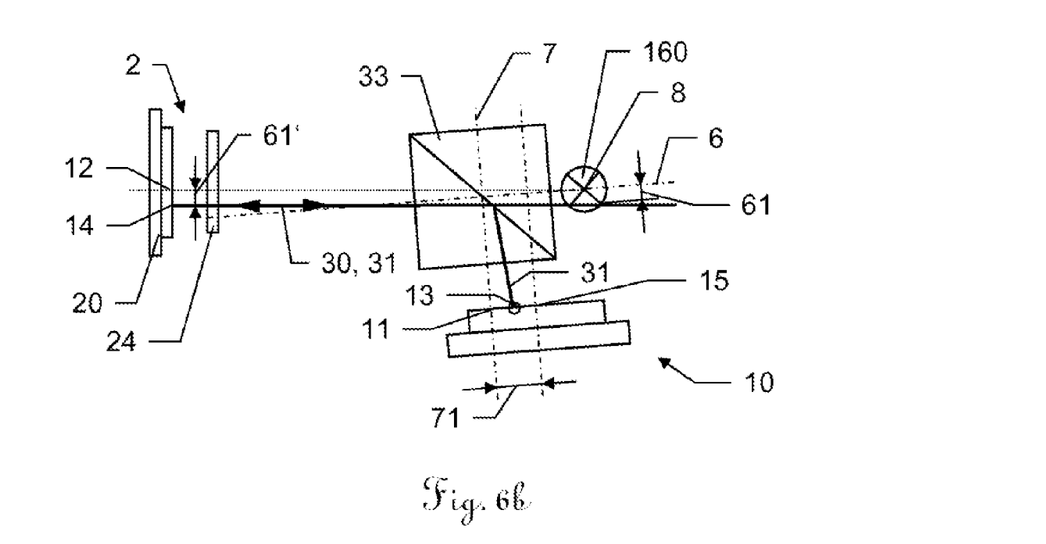

A further development of the invention as one particularly advantageous embodiment enables a determination of the target axis distances in conjunction with, rather than independently of or after, a determination of the target axis direction error, in accordance with the illustrations by FIGS. 6*a*-*b*. For this purpose, a partly light-transmissive plane mirror 24 is arranged upstream of the second PSD 20 in the beam direction of the measurement radiation 30, the measurement radiation 30 being incident on said mirror perpendicularly. In accordance with this embodiment of the invention, the target axis distances to be determined become identifiable simultaneously during the determination of the target axis direction errors on the plane mirror 24, assuming that the target axis direction errors are rather low, and the target axis distances can then be determined from the signals concerning the impingement points of the measurement radiation 30 partly passing through and impinging on the second PSD 20, in a manner as described above with regard to FIGS. 5*a*-*b*. Since the measurement radiation 30 impinges on the partly transmissive plane mirror 24 perpendicularly, no additional offset arises as a result of a plane-plate effect, i.e. beam offset 61' and beam offset 61 are identical in magnitude.

This embodiment of the invention likewise requires a preceding calibration with a determination of imaging scale and rotation, which is implementable by means of the scanning of the surface of the second PSD 20 with the measurement radiation 30, by means of the guidance thereof by the movement of the beam directing unit 110 about the vertical and tilting axes. In addition, the PSD 20, with regard to its light-sensitive surface, must be made large enough to be able still to completely detect the incident measurement radiation 30 in the case of the largest target axis distances to be expected. Advantageously, for this embodiment of the invention, the second PSD 20 is arranged in the beam direction as near as possible behind the partly transmissive plane mirror 24, which, in such a configuration, also fulfils the function of a protective lens in front of the second PSD 20. In particular, the surface of the second PSD 20 can also be reflectively coated in a partly transmissive fashion.

Figure 7A:
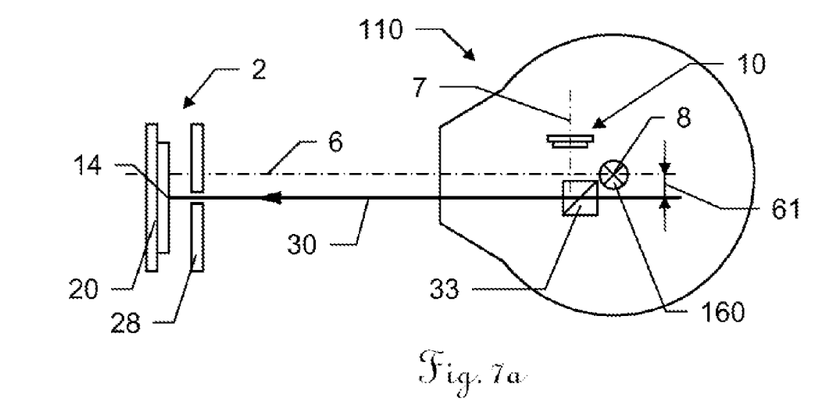
FIGS. 7a-b show a determination of a target axis direction error of the incident laser beam with a third embodiment of the calibration device according to the invention, comprising a second PSD behind a pinhole diaphragm.
Figure 7B:
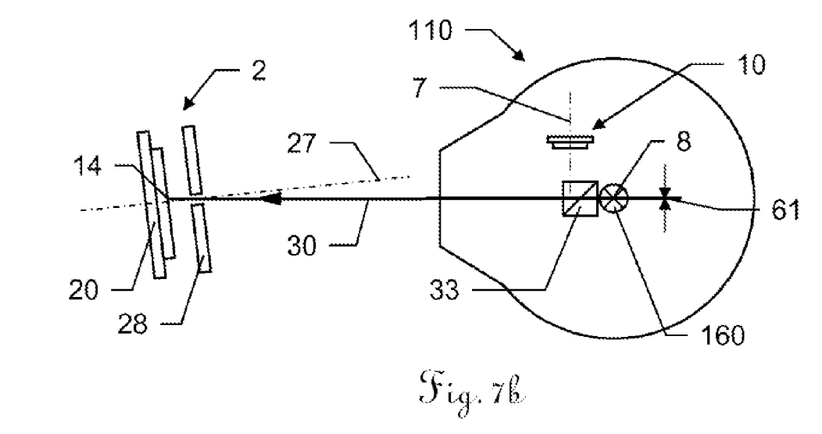

FIGS. 7*a*-*b* show a third embodiment of the calibration device 2 according to the invention, having a second PSD 20 behind a pinhole diaphragm 28 serving as a collimator. Diaphragm 28 and PSD 20 are preferably arranged relative to one another as in a pinhole camera. In this case, the direction of the target axis 6 can be determined independently of a possibly present offset 61 of the target axis 6. The opening of the diaphragm 28 is preferably smaller than the beam diameter of the measurement radiation 30.

Advantageously, moreover, no stringent demands are placed on an exact alignment of the diaphragm axis 27 of the pinhole camera, as is evident from FIG. 7*b*, since a not exactly orthogonal alignment with respect to the target axis 6 can be compensated for with a sufficiently dimensioned PSD 20.

Figure 8A:
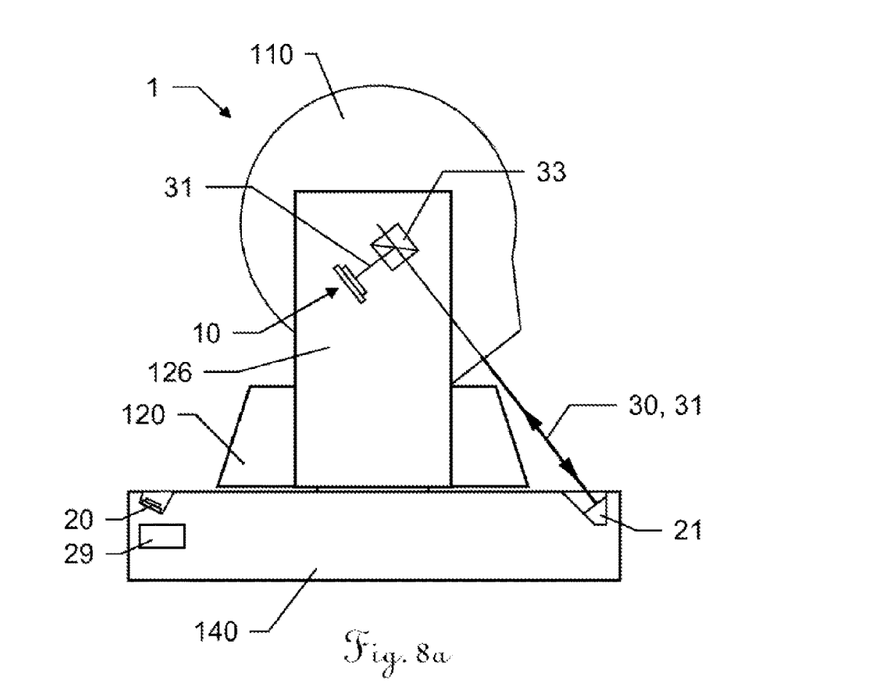
FIGS. 8a-b show a laser tracker with a fourth embodiment of the calibration device according to the invention, comprising a second PSD and a retroreflector, which are integrated into the base.
Figure 8B:
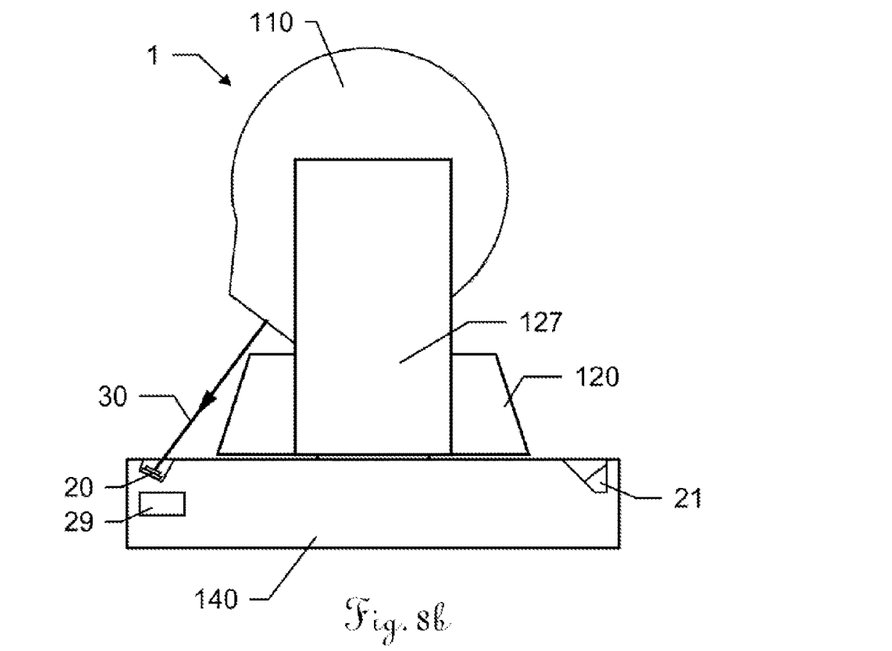

FIGS. 8*a*-*b* schematically show a laser tracker 1 according to the invention in accordance with FIGS. 1 and 2 comprising the beam directing unit 110 connected to the rotatable support 120, and comprising the stationary base 140. The laser tracker 1 comprises a fourth embodiment of the calibration device according to the invention. The latter has a second PSD 20 and a retroreflector 21, which are both integrated into the base 140.

In FIG. 8*a*, measurement radiation 30 provided by a laser light source (not illustrated) is emitted through the beam directing unit 110 onto a retroreflector 21 integrated in the base 140, said retroreflector being embodied as an individual reflector in accordance with the embodiment illustrated here. This can be a prism or a "corner cube", for example. The measurement radiation 30 in the beam orientation illustrated is reflected on itself by the retroreflector 21 as reflected measurement radiation 31 to a beam splitter 33 integrated in the beam directing unit 110. The beam splitter 33 deflects the reflected measurement radiation 31 onto a first PSD 10 integrated in the beam directing unit 110. In addition, a second PSD 20, connected to a data processing unit 29 of the evaluation and control unit of the laser tracker 1 for determining a beam orientation with respect to horizontal and vertical directions, is arranged in the base 140.

The illustration in accordance with FIG. 8*a* illustrates an arrangement for a determination of a beam offset of the reflected measurement radiation 31, impinging on the first PSD 10, relative to the detector center and/or an offset or distance between a target axis—associated with the measurement radiation 30—for a self-calibration of the alignment of the laser tracker 1 and, in particular, its beam directing unit 110.

In this case, the use of a corner cube as retroreflector 21 corresponds to an arrangement for determining a beam offset such as is known for example from the documents US 2009/0109426 and WO 2005/026772.

FIG. 8*b* illustrates, in an arrangement which otherwise corresponds to the illustration in FIG. 8*a*, the orientation of the beam directing unit 110 for emitting the measurement radiation 30 onto the second PSD 20 for determining a direction error of the target axis of the emitted measurement radiation 30, by the determination of an impingement point of the measurement radiation 30 on said second PSD 20.

Figure 9A:
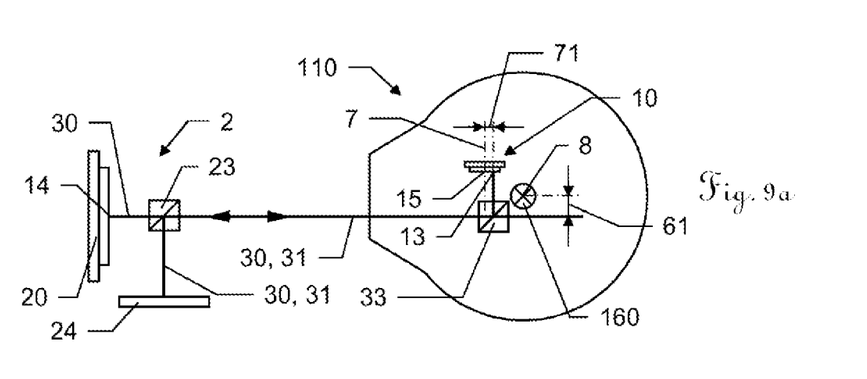
FIGS. 9a-d show a laser tracker with four variants of a fifth embodiment of the calibration device according to the invention, comprising a second PSD and a plane mirror or a retroreflector, which are arranged such that they are simultaneously targetable.
Figure 9B:
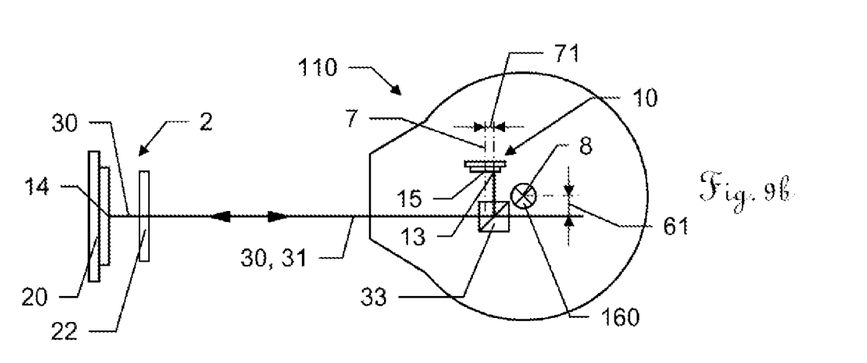
Figure 9C:
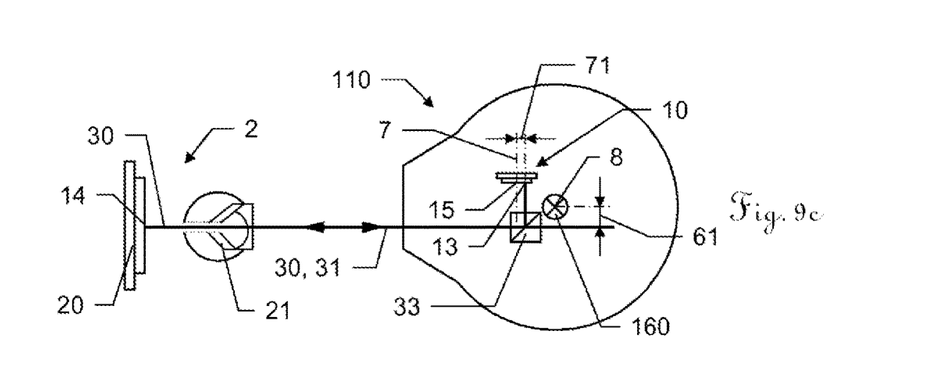

FIGS. 9*a*-*c* show three exemplary variants of a fifth embodiment of the calibration device according to the invention. In this embodiment, the calibration device 2 has a second PSD 20 and a reflection means, wherein the two elements are arranged relative to one another in such a way that they are targetable simultaneously with the measurement radiation 30. The reflection means can be configured in each case as a plane mirror 24 or as a retroreflector 22.

Preferably, a retroreflector 22 in this embodiment—as described in the European patent application having the application number EP12198763.0—can be designed for generating an offset-free, coaxial retroreflection of measurement radiation 30 impinging on it, without in the process generating an offset of the reflected measurement radiation 31 with respect to the direction of the impinging measurement radiation 30. In particular, for this purpose, the retroreflector 22 is embodied as a retroreflective film or a rigid retroreflector composed of plastic, and/or has a multiplicity of reflective spheres and/or prisms.

FIG. 9*a* illustrates a first variant, in which the calibration device 2 has a second beam splitter 23, which guides the measurement radiation 30 onto the second PSD 20 and a plane mirror 24. The measurement radiation 31 reflected from the plane mirror 24 is guided via the second beam splitter 23 and the first beam splitter 33 onto the first PSD 10.

FIG. 9*b* illustrates a second variant, in which a retroreflector 22 embodied as a retroreflective film or a rigid retroreflector is fashioned as partly transmissive to the measurement radiation 30, such that a first part of the measurement radiation 30 passes onto the second PSD 20, and a second part of the measurement radiation 30 is reflected as reflected measurement radiation 31 from the retroreflector 32 via the first beam splitter 33 onto the first PSD 10.

FIG. 9c illustrates a third variant, in which a retroreflector 21 in the form of a triple mirror with partial antireflective coating is positioned upstream of the second PSD 20, such that a first part of the measurement radiation 30 passes onto the second PSD 20, and a second part of the measurement radiation 30 is reflected as reflected measurement radiation 31 from the retroreflector 22 via the first beam splitter 33 onto the first PSD 10.

Figure 9D:
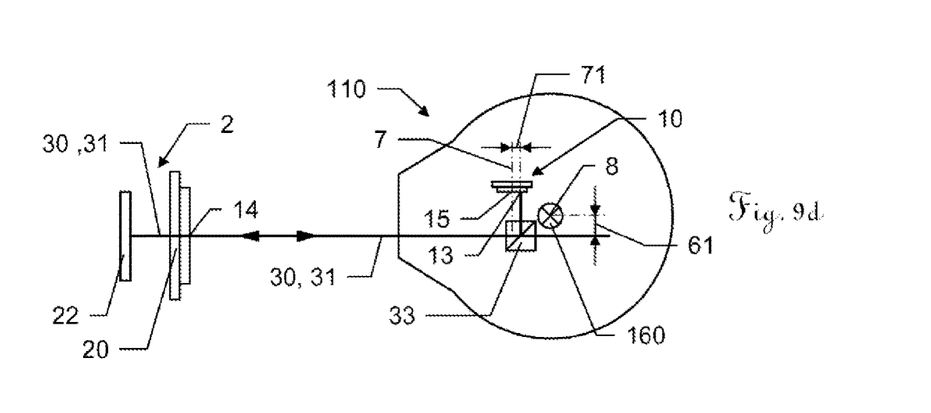

FIG. 9d illustrates a fourth variant, in which the second PSD 20 is fashioned as partly transmissive to the measurement radiation 30, such that part of the measurement radiation 30 impinging on the second PSD 20 passes onto the retroreflector 22 and is reflected from the latter as reflected measurement radiation 31 via the first beam splitter 33 onto the first PSD 10.

It goes without saying that these illustrated figures merely schematically illustrate possible exemplary embodiments. The different approaches can likewise be combined with one another and also with methods and devices from the prior art.

What is claimed is:

1. A laser tracker for determining the position of a target and in particular for continuously tracking the target, comprising
    a beam source for generating measurement radiation,
    a base defining a vertical axis,
    a support defining a tilting axis, which is substantially orthogonal to the vertical axis, wherein the support is pivotable in a motorized fashion about the vertical axis relative to the base and a horizontal pivoting angle is defined by an orientation of the support relative to the base,
    a beam directing unit, which is pivotable in a motorized fashion about the tilting axis relative to the support, wherein a vertical pivoting angle is defined by an orientation of the beam directing unit relative to the support, for emission and orientation of the measurement radiation and for reception of at least part of the measurement radiation reflected at the target,
    angle measuring functionality for determining the horizontal pivoting angle and the vertical pivoting angle,
    distance measuring functionality,
    a first position-sensitive surface detector, and
    an evaluation and control unit for determining an impingement point of the reflected measurement radiation on the surface detector for generating an output signal for determining the position of the target,
    wherein the laser tracker additionally comprises a calibration device for use with a self-calibration functionality, in the context of which calibration parameters are determinable with regard to a position and/or direction of the measurement radiation, wherein:
        the calibration device has on the base a second position-sensitive surface detector, onto which measurement radiation is emittable by the beam directing unit, and
        the evaluation and control unit is designed for determining an impingement point of measurement radiation impinging on the second position-sensitive surface detector, whereby at least one portion of the calibration parameters is determinable with regard to a position and/or direction of the measurement radiation, and
    wherein the laser tracker comprises a first camera for capturing the spatial orientation of the target and at least one second camera for coarsely localizing the target, and/or wherein the measurement radiation is a laser beam, and the laser tracker comprises an absolute distance measuring device and/or an interferometer.

2. The laser tracker as claimed in claim 1, wherein:
    the evaluation and control unit is for controlling a target tracking functionality.

3. The laser tracker as claimed in claim 1, wherein:
    the calibration device has on the base a reflection means, onto which measurement radiation is emittable by the beam directing unit for reflecting the measurement radiation as reflected measurement radiation onto the first position-sensitive surface detector, wherein a servo control point is determinable as part of the calibration parameters.

4. A laser tracker for determining the position of a target and in particular for continuously tracking the target, comprising
    a beam source for generating measurement radiation,
    a base defining a vertical axis,
    a support defining a tilting axis, which is substantially orthogonal to the vertical axis, wherein the support is pivotable in a motorized fashion about the vertical axis relative to the base and a horizontal pivoting angle is defined by an orientation of the support relative to the base,
    a beam directing unit, which is pivotable in a motorized fashion about the tilting axis relative to the support, wherein a vertical pivoting angle is defined by an orientation of the beam directing unit relative to the support, for emission and orientation of the measurement radiation and for reception of at least part of the measurement radiation reflected at the target,
    angle measuring functionality for determining the horizontal pivoting angle and the vertical pivoting angle,
    distance measuring functionality,
    a first position-sensitive surface detector, and
    an evaluation and control unit for determining an impingement point of the reflected measurement radiation on the surface detector for generating an output signal for determining the position of the target,
    wherein the laser tracker additionally comprises a calibration device for use with a self-calibration functionality, in the context of which calibration parameters are determinable with regard to a position and/or direction of the measurement radiation, wherein:
        the calibration device has on the base a second position-sensitive surface detector, onto which measurement radiation is emittable by the beam directing unit,
        the evaluation and control unit is designed for determining an impingement point of measurement radiation impinging on the second position-sensitive surface detector, whereby at least one portion of the calibration parameters is determinable with regard to a position and/or direction of the measurement radiation, and
        a two-position measurement is implementable in the context of the self-calibration functionality by the laser tracker, wherein, in the context of the two-position measurement, measurement radiation is emittable onto the second position-sensitive surface detector in a first and a second orientation of the beam directing unit, wherein the beam directing unit is rotated by 180° with respect to the horizontal pivoting angle in the second orientation in comparison with the first orientation.

5. A laser tracker for determining the position of a target and in particular for continuously tracking the target, comprising
a beam source for generating measurement radiation,
a base defining a vertical axis,
a support defining a tilting axis, which is substantially orthogonal to the vertical axis, wherein the support is pivotable in a motorized fashion about the vertical axis relative to the base and a horizontal pivoting angle is defined by an orientation of the support relative to the base,
a beam directing unit, which is pivotable in a motorized fashion about the tilting axis relative to the support, wherein a vertical pivoting angle is defined by an orientation of the beam directing unit relative to the support, for emission and orientation of the measurement radiation and for reception of at least part of the measurement radiation reflected at the target,
angle measuring functionality for determining the horizontal pivoting angle and the vertical pivoting angle,
distance measuring functionality,
a first position-sensitive surface detector, and
an evaluation and control unit for determining an impingement point of the reflected measurement radiation on the surface detector for generating an output signal for determining the position of the target,
wherein the laser tracker additionally comprises a calibration device for use with a self-calibration functionality, in the context of which calibration parameters are determinable with regard to a position and/or direction of the measurement radiation, wherein:
the calibration device has on the base a second position-sensitive surface detector, onto which measurement radiation is emittable by the beam directing unit, and
the evaluation and control unit is designed for determining an impingement point of measurement radiation impinging on the second position-sensitive surface detector, whereby at least one portion of the calibration parameters is determinable with regard to a position and/or direction of the measurement radiation,
wherein the calibration device:
has an optical element arranged upstream of the second position-sensitive surface detector in the beam direction of the measurement radiation, wherein the optical element
is provided on the base in a known spatial relation with respect to the second position-sensitive surface detector, and
is fashioned and arranged in such a way that calibration parameters are determinable with regard to a direction of the measurement radiation.

6. The laser tracker as claimed in claim 5, wherein:
the optical element has a pinhole diaphragm having at least one opening which is transmissive to the measurement radiation, wherein
the opening of the pinhole diaphragm is smaller than a diameter of the measurement radiation,
the laser tracker is designed for moving the measurement radiation in a grid over the pinhole diaphragm, and/or
the pinhole diaphragm has an optical grating for generating an interference pattern on the second position-sensitive surface detector.

7. The laser tracker as claimed in claim 6, wherein:
the pinhole diaphragm has a reflection means for reflecting part of the measurement radiation onto the first position-sensitive surface detector, wherein the reflection means
is fitted on a surface of the pinhole diaphragm facing the beam directing unit or forms such a surface, and/or
adjoins the opening of the pinhole diaphragm.

8. The laser tracker as claimed in claim 7, wherein:
the reflection means at least comprises
a plane mirror,
a retroreflector designed as a prism or as a corner cube, or
a retroreflector designed for generating an offset-free, coaxial retroreflection of measurement radiation impinging on it, without generating in the process an offset of the reflected measurement radiation with respect to the direction of the impinging measurement radiation, wherein the retroreflector is embodied as a retroreflective film or a microprism array.

9. The laser tracker as claimed in claim 8, wherein:
the retroreflector comprises either or both plastic and glass.

10. The laser tracker as claimed in claim 8, wherein:
the retroreflector comprises a plurality of reflective spheres and/or prisms.

11. The laser tracker as claimed in claim 5, wherein:
the optical element is designed for reflecting part of the measurement radiation as reflected measurement radiation onto the first position-sensitive surface detector
as a reflection means that is partly transmissive to the measurement radiation, or
as a beam splitter designed to guide measurement radiation partly onto the second position-sensitive surface detector and partly onto a reflection means.

12. A self-calibration method for a laser tracker, wherein the laser tracker comprises:
a beam source for generating measurement radiation,
a base defining a vertical axis,
a support defining a tilting axis, which is substantially orthogonal to the vertical axis, wherein the support is pivotable in a motorized fashion about the vertical axis relative to the base and a horizontal pivoting angle is defined by an orientation of the support relative to the base,
a beam directing unit, which is pivotable in a motorized fashion about the tilting axis relative to the support, wherein a vertical pivoting angle is defined by an orientation of the beam directing unit relative to the support, for emission and orientation of the measurement radiation and for reception of at least part of the measurement radiation reflected at the target, comprising a first position-sensitive surface detector for determining an impingement point of the reflected measurement radiation on the first position-sensitive surface detector and for generating an output signal for controlling a target tracking functionality, and
a calibration device for use with a self-calibration functionality, in the context of which calibration parameters are determinable with regard to a position and/or direction of the measurement radiation, wherein the calibration device has a second position-sensitive surface detector on the base, and the method comprising:
emitting measurement radiation onto the second position-sensitive surface detector, determining an impingement point of the measurement radiation on the second position-sensitive surface detector, determining calibration parameters with regard to a position and/or direction of the measurement radiation, and generating a shadow casting, an interference pattern and/or a sharp imaging of the measurement radiation on the second position-sensitive surface detector.

13. The self-calibration method as claimed in claim 12, further comprising:

generating the shadow casting, the interference pattern and/or the sharp imaging of the measurement radiation on the second position-sensitive surface detector by means of a pinhole diaphragm, an optical grating and/or an optical lens.

14. The self-calibration method as claimed in claim 12, further comprising:

moving the measurement radiation in a grid over a pinhole diaphragm arranged upstream of the second position-sensitive surface detector in the beam direction of the measurement radiation for ascertaining an intensity distribution within the measurement radiation and/or a centroid of the measurement radiation on the second position-sensitive surface detector.

15. The self-calibration method as claimed in claim 12, wherein:

emitting measurement radiation onto a retroreflector, generating a retroreflection of measurement radiation impinging on the retroreflector as reflected measurement radiation, determining an impingement point of the measurement radiation reflected by the retroreflector on the first position-sensitive surface detector, and determining a servo control point.

16. The self-calibration method as claimed in claim 12, wherein:

simultaneously emitting the measurement radiation onto the second position-sensitive surface detector and onto a reflection means, wherein a first part of the measurement radiation impinges on the second position-sensitive surface detector, and a second part of the measurement radiation is reflected by the reflection means as reflected measurement radiation onto the first position-sensitive surface detector, wherein the reflection means comprises a retroreflector and/or a plane mirror, and/or is partly transmissive to the measurement radiation.

17. The self-calibration method as claimed in claim 12, wherein:

a two-position measurement, in the context of which the measurement radiation is emitted onto the second position-sensitive surface detector in a first and a second orientation of the beam directing unit, wherein the beam directing unit is rotated by 180° with respect to the horizontal pivoting angle in the second orientation compared with the first orientation, and determining the impingement point of the measurement radiation on the second position-sensitive surface detector for both orientations.

* * * * *